United States Patent [19]

Gianfilippo

[11] Patent Number: 4,712,590
[45] Date of Patent: Dec. 15, 1987

[54] ELECTRICAL CONNECTION MEANS FOR MULTIPLE BULK COMPOUNDING SYSTEMS

[75] Inventor: Aleandro Di Gianfilippo, Crystal Lake, Ill.

[73] Assignee: Baxter Travenol Laboratories, Inc., Deerfield, Ill.

[21] Appl. No.: 868,974

[22] Filed: May 30, 1986

[51] Int. Cl.⁴ .............................................. B65B 3/30
[52] U.S. Cl. ........................................ 141/83; 141/84; 141/94; 141/99; 141/100; 73/32 R; 222/77; 604/81; 604/153; 604/245
[58] Field of Search .................. 141/1, 9, 83, 100–107, 141/234–248, 84, 99; 177/1, 70, 80, 121, 137, 164, 210 R, 50, 211; 604/65, 67, 80, 81, 151–153, 245, DIG. 13; 222/77; 73/32 R

[56] References Cited

U.S. PATENT DOCUMENTS

| | | | |
|---|---|---|---|
| 4,077,441 | 3/1978 | Rosen et al. | 141/84 |
| 4,256,153 | 3/1981 | Lamaziere | 141/84 |
| 4,513,796 | 4/1985 | Miller et al. | 141/83 |

OTHER PUBLICATIONS

Brochure—Travenol® Automix ™ High Speed Compounder—"The Pharmacy Time Machine of Tomorrow for Today's Pharmacy Needs", 1982.

Primary Examiner—Houston S. Bell, Jr.
Attorney, Agent, or Firm—Paul Flattery; Kay Pierce

[57] ABSTRACT

A device for connecting two or more bulk compounding systems for mixing hyperalimentation solutions is described. The device allows electrical signals from each bulk compounding system to be connected to one another so that each bulk compounding system may act in concert with other bulk compounding systems to fill an individual receiving container with minimal modifications to the internal circuitry of an individual bulk compounding system.

9 Claims, 14 Drawing Figures

ELECTRICAL CONNECTION MEANS FOR MULTIPLE BULK COMPOUNDING SYSTEMS

BACKGROUND OF THE INVENTION

The present invention pertains to systems for transferring precise amounts of fluid solutions at high speeds, and more particularly to means for coupling two or more of such systems together. Such systems are especially useful for the compounding of hyperalimentation solutions.

As background information, hyperalimentation therapy is the intravenous feeding of, for example, a protein-carbohydrate mixture to a patient. It is used primarily to meet the patient's protein and caloric requirements which are unable to be satisfied by oral feeding. The protein may be in the form of free-amino acids or protein hydrolysate and the carbohydrate commonly is dextrose. In addition to the protein and carbohydrate, vitamins (water-soluble and fat-soluble) and electrolytes also can be supplied in this therapy.

Each of these parenteral ingredients and the combination thereof are particularly susceptible to the growth of deleterious organisms and it is desirable that they be administered to the patient in a sterile condition. Thus, because these protein and carbohydrate solutions cannot be pre-compounded by the manufacturer, but must be combined at the time of their use, their compounding must be performed under sterile conditions to avoid organism growth.

U.S. Pat. No. 4,513,796 to Miller et al. describes a bulk compounding system in which multiple solutions are transferred from separate sources to a single container. The system includes a controller that surveys various process conditions and warrants of any failure of those conditions. Each source of solution is in fluid communication with the container through independent flexible tubing. Fluid flow through the tubing is controlled by multiple peristaltic pumps.

It has been known in the past that to ensure sterility during the compounding of hyperalimentation solutions, compounding should be performed under a laminar flow hood. Laminar flow hoods are used for reducing the risk of airborne contamination of such solutions. These units operate by taking room air and passing it through a pre-filter to remove gross contaminates, such as dust and lint. The air is then compressed and channeled through a bacterial retentive filter in the hood in a laminar flow fashion. The purified air flows out over the entire work surface of the hood in parallel lines at a uniform velocity. The bacterial retentive type of filter is designed to remove all bacteria from the air being filtered.

Compounding under a laminar flow hood aids in preventing airborne contamination, but it is relatively cumbersome and expensive and would not be useful for eliminating any other source of contamination, such as contamination caused by handling. When using a hood, the operator may inadvertently perform the work at the end or outside of the hood and not within the recommended space, at least six (6) inches within the hood, which insures the benefits of the air being purified. Time must be taken and care must be exercised to maintain a direct open path between the filter and the compounding area. Solution bottles and other non-sterile objects cannot be placed at the back of the hood work area next to the filter because these objects could contaminate everything downstream and disrupt the laminar flow pattern of the purified air. Also, in using a laminar flow hood, it is necessary routinely to clean the work surface of the hood before any compounding is performed.

As can be seen from the above discussion, it is very important that any equipment designed to be used under a laminar flow hood does not disrupt the laminar flow of air across the equipment at any location of the equipment which is important to keep sterile. For example, in the situation in which hyperalimentation solutions are compounded under a laminar flow hood, any connectors between the solution source bags and the container to be filled with hyperalimentation solution must be carefully designed so that laminar flow at the connection points is maintained. A particularly critical junction with respect to bulk compounding systems for producing hyperalimentation solutions is the juction between the container to be filled and a manifold which receives all the tubing from the source containers. The present invention takes into consideration this need for maintaining laminar flow across such a junction and, in addition, provides a relatively simple means of combining two or more bulk compounders of the type described in U.S. Pat. No. 4,513,796 together to enable a user to compound a wider variety of solutions.

OBJECTS OF THE INVENTION

An object of the subject invention is to provide a means for combining two or more bulk compounding systems together to allow a user to compound a greater number of fluids.

Another object of the subject invention is to provide a means for electrically interfacing two or more bulk compounding systems so that a user is able to cause fluids controlled by a number of bulk compounding systems to be transferred into a single container.

Another object of the subject invention is to provide a manifold for receiving multiple sets of tubing from different bulk compounding systems for fluid transfer into a single container in which the manifold includes an outlet port which can be situated to be exposed to laminar air flow.

Yet another object of the subject invention is to provide an economic means for providing a highly flexible device for compounding a wide variety of fluids into a single container.

Other objects, advantages, and novel features of the present invention will become apparent from the following detailed description of the invention when considered in conjunction with the accompanying drawings. Before explaining the embodiments of the invention in detail, it is to be understood that the invention is not limited in its application to the details of the construction and to the arrangement of components as set forth in the following description, or as illustrated in the accompanying drawings. The invention is capable of other embodiments and of being practiced and carried out in various ways. Furthermore, it is to be understood that the phraseology and terminology employed are for the purpose of description and should not be regarded as limiting.

SUMMARY OF THE INVENTION

The subject invention can be described as a means for connecting multiple bulk compounding systems together in which each compounding system precisely controls fluid transfer of at least one solution to a container. Each bulk compounding system includes a plurality of solution sources for containing a plurality of individual solutions. A manifold is used to connect individual fluid lines from each of the fluid sources to a manifold which is in fluid communication with the receiving container. Each bulk compounding system includes a pumping means for pumping fluid in each of the individual fluid lines. In accordance with the invention, a control means is provided which includes a first means for sensing the weight of fluid in a container, and a peripheral interface unit. The peripheral interface provides a first set of input signals for selecting an amount of fluid to be transferred from each source to the receiving container. The peripheral interface unit also provides a first set of output signals for displaying the amount of solution to be transferred, and a second set of output signals for controlling the pump means to deliver a predetermined amount of solution from each source to the container in response to the amount of fluids sensed in the container.

In accordance with the invention, a connector means is provided for connecting the second set of output signals from each of the bulk compounding systems to allow multiple bulk compounding systems to act in concert to fill a single receiving container. The connector means includes a multiplexer means for receiving the second set of output signals from the control means of each bulk compounding system, and for generating a plurality of output signals to activate specific portions of the pumping means to control flow of fluid from each of the solution sources into the container.

The invention also includes the use of another connector means for connecting the first set of output signals from the controller means of each bulk compounding system to generate a plurality of output signals which display the specific amount of fluid to be transferred from each source to the container.

In one embodiment of the invention, a novel manifold is provided for connecting a plurality of inlet lines into a single outlet line. The manifold includes a cylindrical housing having a first plurality of radially extending input ports in a first plane, and a second plurality of radially extending input ports in a second plane. The first and second planes may have an intersecting angle ranging from 60° to 120°. The housing also includes a single axially extending output port.

The invention includes the novel feature that pumping modules for each bulk compounder may be placed one above the other, yet vertically spaced apart from each other to enhance laminar flow along the sides of each module when placed under a laminar flow hood having air flowing from the back to the front of each pumping module. In one embodiment of the invention, the manifold described above may be attached to one of the pumping modules so that the axially extending outlet port is oriented generally toward the back of the pumping module. The placement and design of the manifold is such that laminar air flow is present across the critical outlet port of the manifold.

DESCRIPTION OF THE PREFERRED EMBODIMENTS

Figure 1:
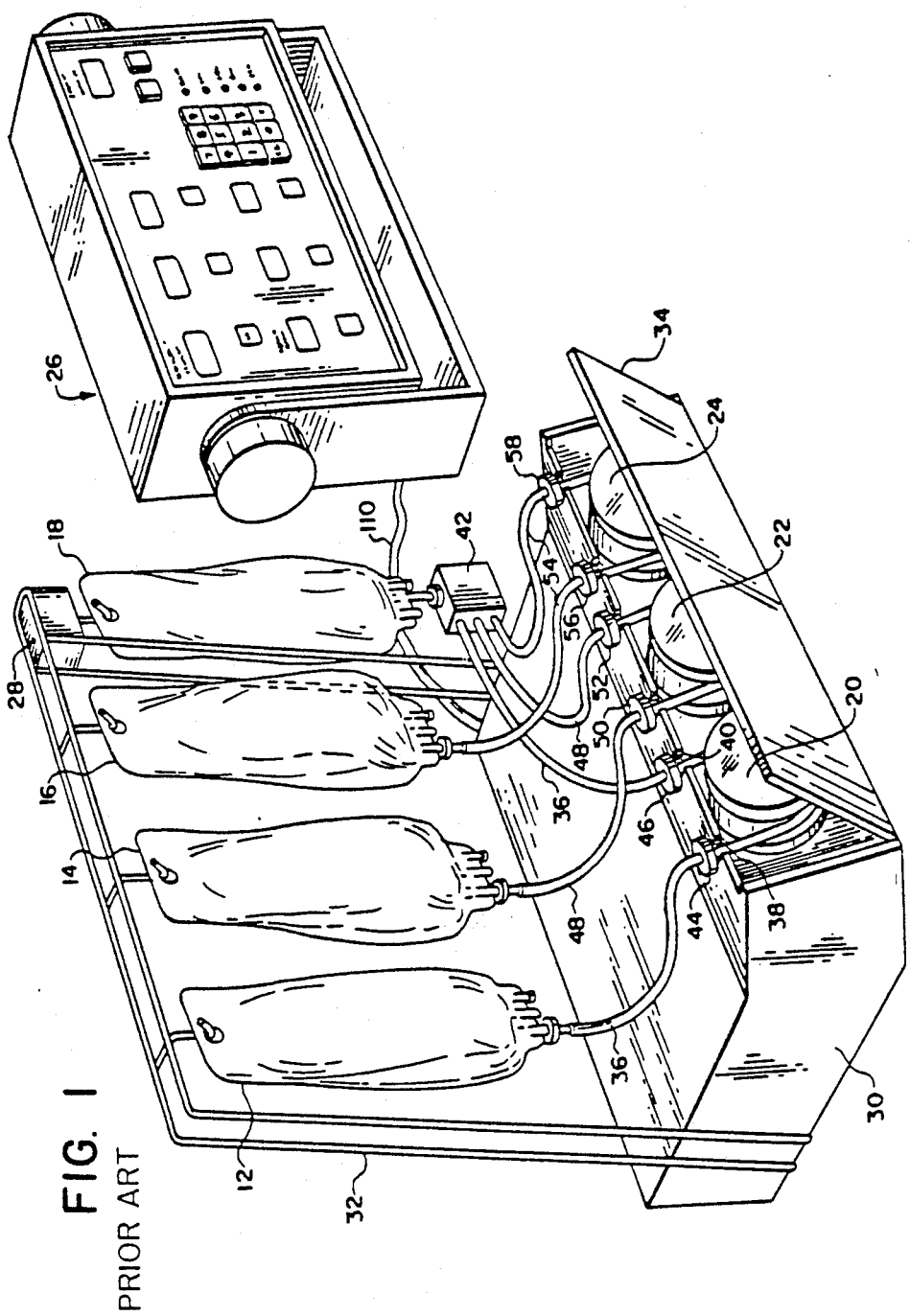
FIG. 1 is a perspective view of a single bulk compounding system.

Referring now to FIG. 1, a single bulk compounding apparatus 10 is illustrated. A single bulk compounding system will be first described in detail and then the various features of the present invention which involve coupling two or more bulk compounding systems together will be described.

The single bulk compounding system delivers sterile solutions contained in supply containers 12, 14 and 16 respectively to a sterile receptacle or collection container 18. A flexible plastic container used in accordance with this invention is one marketed by Travenol Laboratories, Inc. of Deerfield, Ill. under the registered trademark VIAFLEX.

The apparatus 10 delivers the sterile solutions to be compounded sequentially from the supply containers 12, 14 and 16 to the collection or receiving container 18 by means of peristaltic pumps 20, 22 and 24. The pumps 20, 22 and 24 are operatively controlled by data entered in a controller 26 and the information transmitted to the controller 26 by a load cell 28.

The controller includes a first means for sensing the weight of fluid in the container. This means will be described in greater detail below. In addition, the controller includes a second means having a peripheral interface unit. The peripheral interface unit generates a first set of input signals for selecting an amount of fluid to be transferred from each supply container 12-16 to the receiving container 18. The peripheral interface unit also generates a first set of output signals for displaying the amount of solution to be transferred. This display function will also be described in greater detail below. Finally, the peripheral interface unit generates a second set of output signals for controlling peristaltic pumps 20-24 to deliver a predetermined amount of solution from the supply containers 12-16 to the receiving container 18.

In a single system, the supply containers 12, 14 and 16 and the collection container 18 are supported vertically above a housing 30 by a bracket 32. However, the bracket 32 is not used in the preferred embodiment of the invention when two or more bulk compounding systems are used in conjunction with each other as described more fully below with respect to FIG. 4.

In a single system, the housing 30 provides an enclosure for pumps 20, 22 and 24 and has a housing door 34 movable for easy access to the pumps 20, 22 and 24 for loading, servicing and maintenance thereof. The housing door 34 also serves as a protective cover during operation of the pumps.

The supply container 12 is coupled with the collection container 18 by flexible tubing 36. The flexible tubing 36 enters the housing 30 at inlet 38 and is placed around rollers (not shown) of the peristaltic pump 20. The flexible tubing 36 can be connected to another portion of flexible tubing (not shown) for placement around the rollers of the peristaltic pump. The tubing 36 then exits the housing 30 at outlet 40 and enters a junction block 42 coupled to the collection container 18. The junction block 42 provides a channel through which solutions being pumped through a flexible tube can flow to the collection container 18.

The peristaltic pump 20, in operation, transfers the sterile solution in the supply container 12 to the collection container 18 by movement of the rollers (not shown) in the pump 20. This movement causes a compression of the walls of the flexible tubing 36 forcing the solution therein forward in a capillary type action. Retainers 44 and 46 are placed around the flexible tubing 36 at its entrance to and exit from the housing 30 to keep the tubing 36 in place during the operation of the pump 20.

The supply container 14 is coupled with the collection container 18 by the flexible tubing 48. The sterile solution in the container 14 is delivered to the container 18 by the peristaltic pump 22 in a similar fashion to the fluid delivery from container 12 caused by the pump 20. The flexible tubing 48 also has retainers 50 and 52 placed in a similar manner to the retainers 44 and 46 of the flexible tubing 36. The supply container 16 is coupled with the collection container 18 by flexible tubing 54 with the peristaltic pump 24 therebetween. The tubing 54 has retainers 56 and 58 identical in placement and purpose to the retainers 44, 46, 50 and 52.

Figure 2:
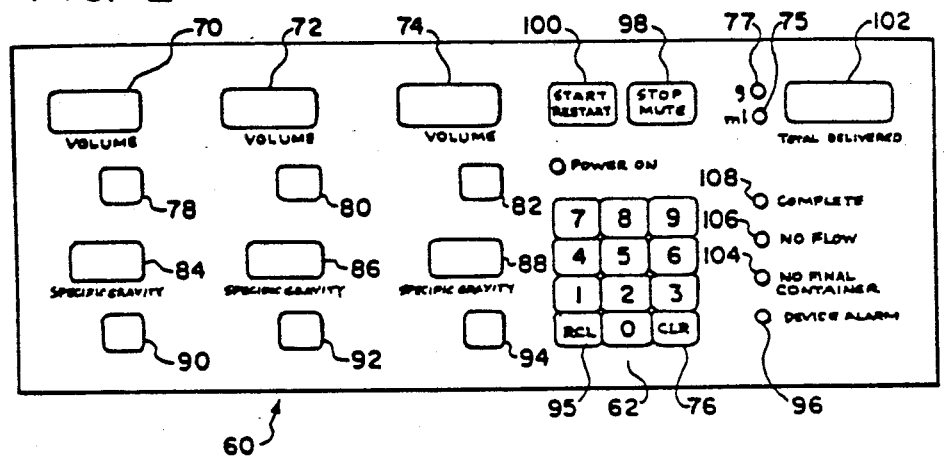
FIG. 2 is a front view of a single control panel for a bulk compounding system.

The controller 26 has a control panel 60 as best seen in FIG. 2. The control panel 60 has a twelve character keyboard 62 consisting of digits 0 through 9, a recall key and a clear keyboard key. Each of the supply containers is associated with, on the control panel 60, a volume to be delivered display 70, 72 and 74; a volume to be delivered entry switch 78, 80 and 82 for entering respective volume information; a specific gravity display 84, 86 and 88; and a specific gravity entry switch 90, 92 and 94 for entering respective specific gravity information.

To enter the desired value for the volume to be delivered to the collection container 18 from the supply container 12, for example, the volume to be delivered switch 78 is depressed. The volume display 70 then flashes as the desired volume is entered by depressing the appropriate keys of the keyboard 62. The entry of the desired volume is viewed on the volume display 70, and if correct, the volume is registered by depressing switch 78 again or by depressing the next desired entry switch. During entry of the volume information, a light 75 is illuminated informing the operator that the units being entered are in milliliters. Further, as each value for volume is registered, the cumulative total can be displayed in the display 102. If the volume entered is incorrect, the clear button 76 on the keyboard 62 is depressed to erase the volume previously entered and the correct volume is then entered and registered in accordance with the above-described procedures.

Once all the volume information has been entered an registered and the containers connected, the apparatus 10 can be operated. By depressing START/RESTART switch 100, the compounding operation begins, the volume to be delivered displays 70, 72 and 74 are zeroed automatically and count up as the volume of each solution is delivered one solution at a time to the collection container 18. The volume information will be retained on the displays until the container 18 is removed. The total volume to be delivered display 102 also will be zeroed automatically and register as the solutions are delivered to provide cumulative volume information which is indicated by light 75 being illuminated. The information likewise will be retained until removal of the container 18 occurs.

The controller 26 also includes internal electrical checks to monitor various electrical components as well as the amount per unit time functions of the device. In the event of a malfunction of one of these conditions, the compounder will cease operations and device alarm light 96 will be illuminated. These operating functions have been selected to be non-fixable by the operator and, therefore, the compounder will not allow a restart until properly serviced.

Figure 3:
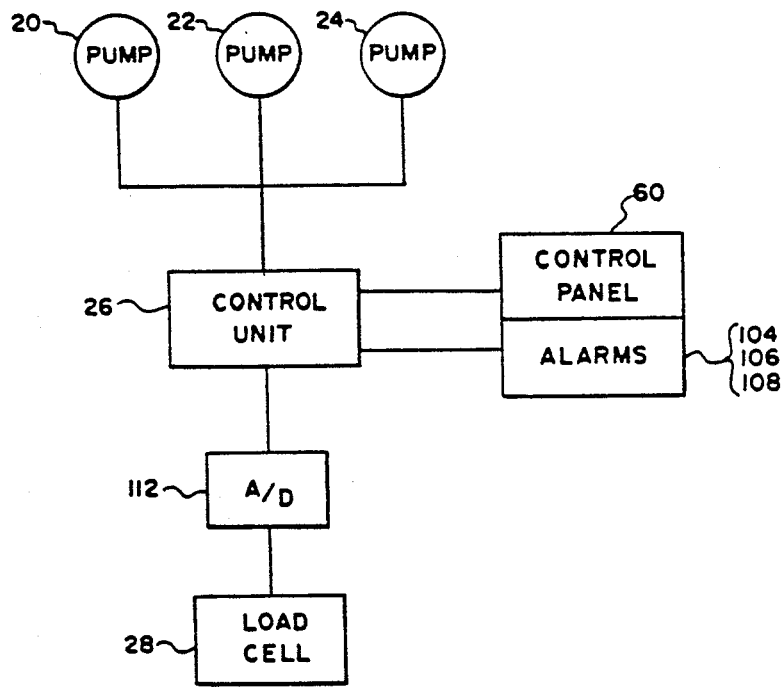
FIG. 3 is a schematic block diagram of a single bulk compounding system.

FIG. 3 depicts, in block form, how volume and failures of predetermined operating conditions are sensed and interpreted in a single bulk compounding system. The controller 26 receives information from load cell 28 and directs electrical current through electrical connector 110 (FIG. 1) to drive the pumps 20, 22 and 24. After the desired volume and specific gravity information has been entered and registered, switch 100 is depressed to state the compounding operation. In operation, the controller 26 activates the pump 20 which continues pumping until the weight sensed by load cell 28, of the container 18, corresponds to the amount registered in the controller 26.

An analog-to-digital converter 112 converts the analog signal of the load cell 28 to a digital signal readable by the controller 26. The controller 26 then converts volume and specific gravity information to a value of weight and compares it to the weight sensed by the load cell. Once the volume of the solution from the container 12 has been delivered, pump 20 is deactivated by controller 26 and solutions from the container 14 and then the container 16 are then delivered in accordance with the above discussion. When all the solutions have been delivered, controller 26 senses a complete compounding operation and activates alarm 108 on control panel 60.

Figure 4:
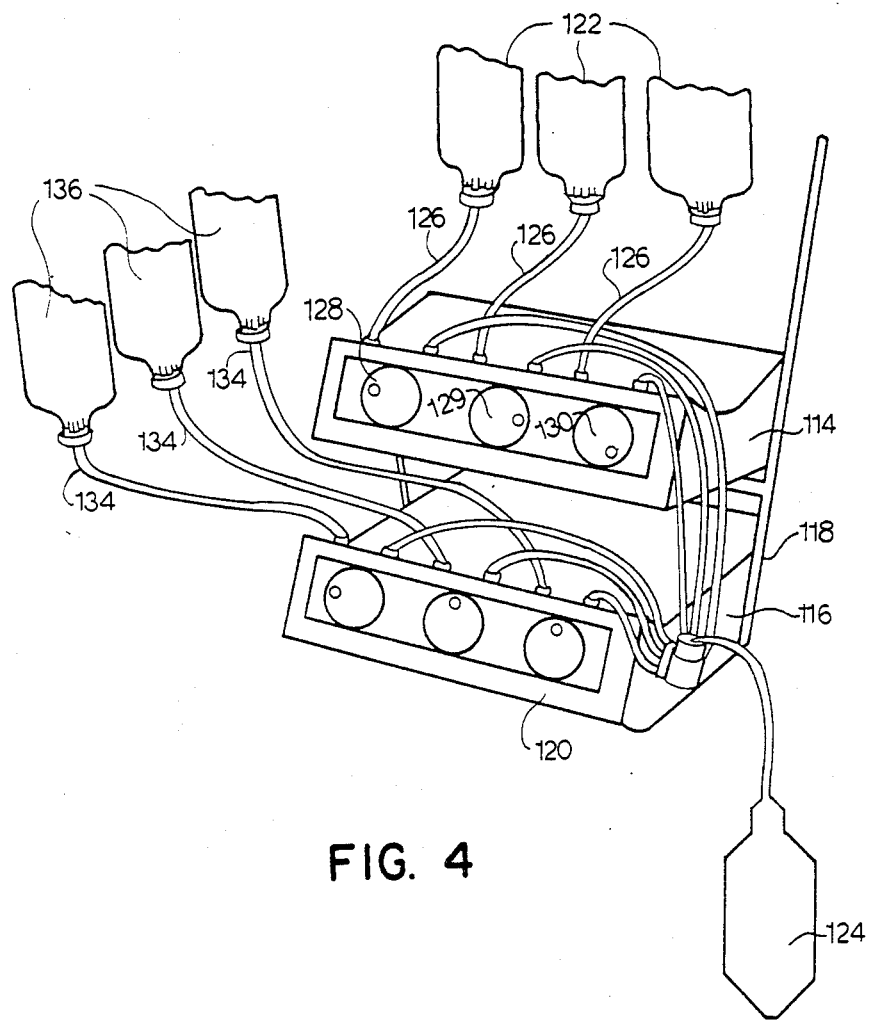
FIG. 4 illustrates two pumping modules of two separate bulk compounding systems working together to fill a single receiving container.

Refer now to FIG. 4 which illustrates the use of two pumping modules, 114 and 116 from separate bulk compounding systems acting in conjunction with one another to fill an individual receiving container in accordance with the invention. As can be seen from the figure, pumping module 114 is spaced above pumping module 116 so that laminar air flow can be enhanced around the sides of both pumping modules when laminar air is flowing from the back 118 to the front 120 of each module. In one embodiment of the invention, the upper module 114 is spaced apart from the lower module 116 by at least one-sixth the height of the lower module. In other embodiments of the invention, the spacing between the two modules may be as great as the height of the lower module. In the preferred embodiment of the invention, the distance between the two modules is one third the height of the lower module.

As can be seen in FIG. 4, a first plurality of solution sources 122 is connected to a single container 124 through a first plurality of fluid lines 126. Fluid through each fluid line is controlled by a separate pump 128-130 in a first pumping module. A second plurality of solution sources 132 is connected to the container 124 through a second plurality of fluid lines 134. Fluid through each of these sources is controlled by a separate pump in the second pumping module 116. The invention includes the use of a connector means for connecting the output signals from the control means for controlling the amount of fluid to be transferred from each of the solution sources 122 and 132 into the container 124. The connector means includes a multiplexer means which will be described in greater detail below in a discussion relating to the electronics of the invention.

Figure 5:
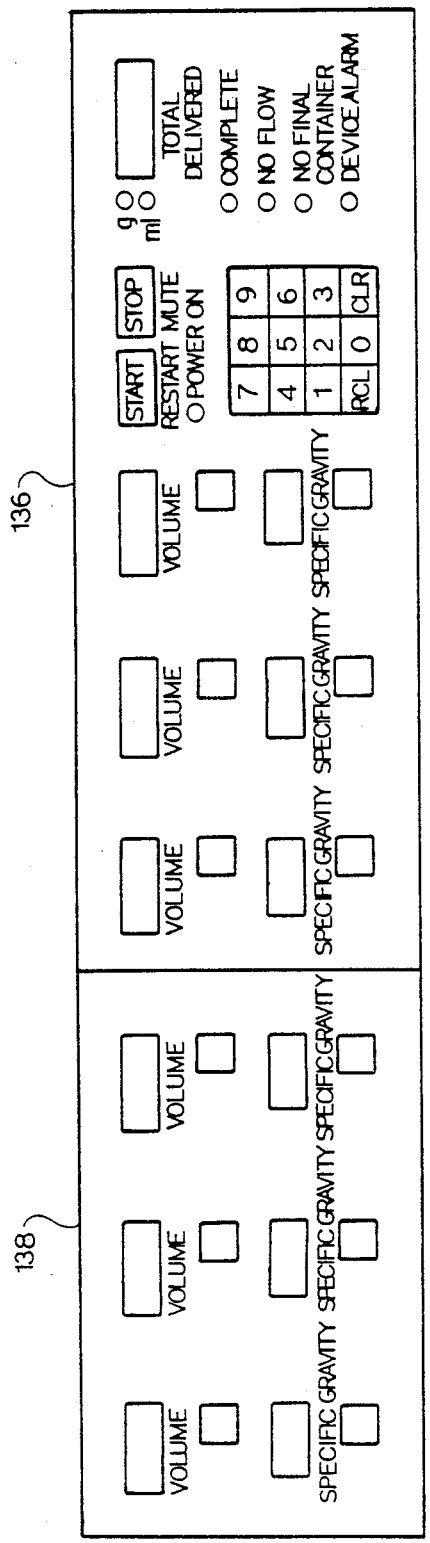
FIG. 5 is a front view of a control panel for two or more bulk compounding systems connected to each other.

FIG. 5 illustrates a front panel of the invention when two or more bulk compounding systems are used in conjunction with each other. FIG. 5 can be compared to FIG. 2 which illustrates a front panel of a single bulk compounding system. As can be seen in FIG. 5, the front panel for use with a multiple bulk compounding device includes a basic panel 136 and an add-on panel 138. The basic panel includes all the features of the front panel described above for a single bulk compounding system. while the add-on panel 138 displays only volume and specific gravity for each additional set of source solutions controlled by a separate pumping module. The interface between the add-on module 138 and the basic module 136 will be described in greater detail below.

Figure 6:
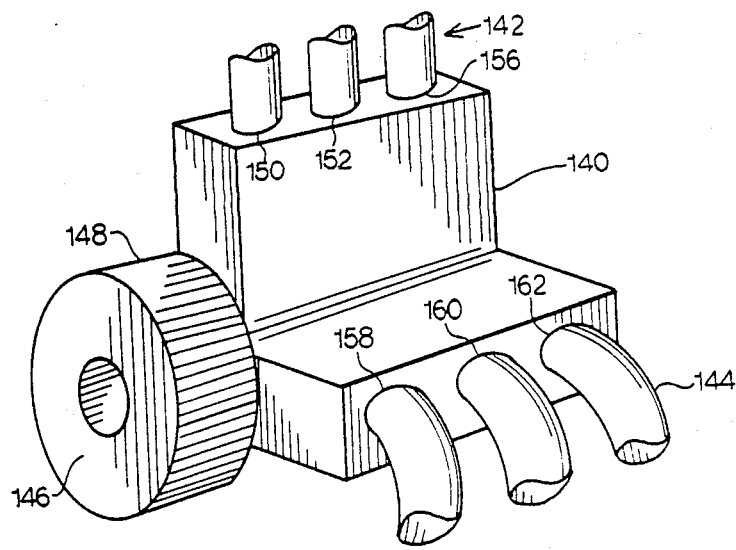
FIG. 6 is an isometric view of a manifold in accordance with the invention.

FIG. 6 illustrates one embodiment of the subject invention in which a novel manifold 140 is used to provide fluid communication through multiple sets of input lines 142 and 144 to a single output port 146. As can be seen in the figure, the manifold 140 includes a generally cylindrical housing 148 having a first plurality of radially extending input ports 150-156 in a first plane, and a second plurality of radially extending input ports 158-162 in a second plane. The angle formed by the intersection of the first and second planes may range from 60° to 120°. However, in the preferred embodiment, the angle formed by the intersection of the first and second planes is on the order of 90°. In the preferred embodiment of the subject invention, each of the input ports in the first plurality of input ports 150-156 is in the same horizontal plane as a corresponding input port in the second plurality of input ports 158-162. By locating corresponding input ports in the same horizontal plane and by spacing the input ports close together, it is possible to significantly reduce the length of the cylindrical housing to reduce the amount of fluid required to flush the cylindrical housing when solution from one source is being changed to solution from another source. This is very important in the field of mixing solutions for hyperalimentation and other medical purposes because small discrepancies in the amount of fluid actually transferred versus the amount of fluid desired to be transferred can have highly undesirable results.

Figure 7:
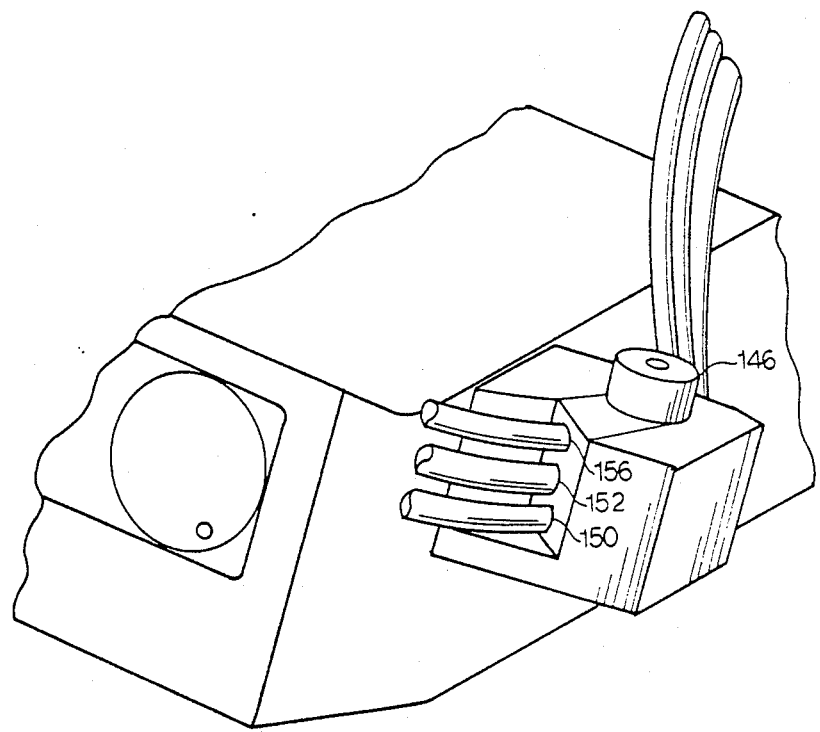
FIG. 7 is an isometric view of a manifold attached to a pumping module with the outlet port of the manifold oriented to enhance laminar flow.

A major purpose of having the first plurality of input ports 150-156 at an angle from the second plurality of input ports 158-162 is illustrated in FIGS. 4 and 7. FIG. 7 also illustrates an important feature at the invention which is to orient the outlet port 146 toward the back of a pumping module when the manifold 140 is attached to the module and laminar air flows from the back towards the front of the module. The orientation of the manifold 140 as it is attached to the pumping module 116 allows for laminar air flow at the outlet port 146, and by having the first plurality of input ports 150-156 at an angle with the second plurality of input ports 158-162, laminar air flow is not disrupted at the outlet port 146. Therefore, the chances of bacteria or other foreign bodies entering the container 124 through outlet port 146 are greatly reduced. This is very important since the connection between container 124 and outlet port 146 will be disrupted each time a new container 124 is to be filled.

Figure 8:
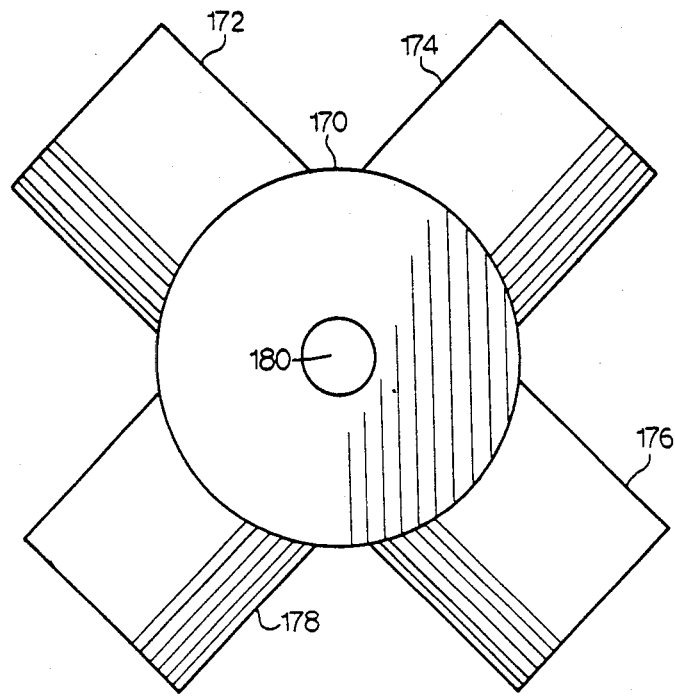
FIG. 8 illustrates a top view of an alternative embodiment of the manifold of FIG. 6 for use with four separate compounding systems.
Figure 9:
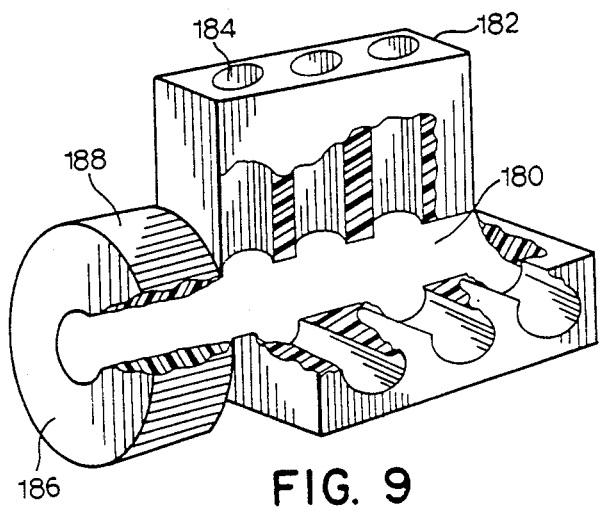
FIG. 9 is a cutaway view of a manifold illustrating the fluid connections between the multiple inlet ports of the manifold to the single outlet port of the manifold.

In another embodiment of the invention as illustrated in FIG. 8, the manifold 170 may have four separate sets of inlet ports 172-178. Each set of inlet ports may be spaced generally 90° apart from the closest set of inlet ports on either side. FIG. 8 illustrates a top view of the manifold, so the individual inlet ports in each set is not illustrated. However, each set of inlet ports 172 would be in fluid communication with a common channel 180 similar to the configuration shown in FIG. 9 for a two-set inlet port-type manifold 182. As can be clearly seen in FIG. 9, each inlet port 184 is in fluid communication with common channel 180 which, in turn, is in fluid communication with outlet port 186. The embodiment illustrated in FIG. 8, having four separate sets of inlet ports is useful when it is desired to combine four separate compounding systems together to act in concert to fill a single receiving container. In other embodiments of the invention, it may be desirable to combine three separate bulk compounding systems together. In that event, a manifold having three sets of inlet ports would be desired, in which each set of inlet ports is spaced apart from the other sets by 120°.

Referring again to FIG. 9, as can seen in the preferred embodiment, each inlet port 184 radially extends from a cylindrical housing 188 of the manifold 182. This embodiment is preferred because it greatly reduces the volume of common channel 180 in the manifold.

While the mechanical features of combining two or more bulk compounding systems in accordance with the invention have been described above, it is important to fully understand how it is possible to electronically connect two or more compounding systems so that they may act in concert to fill a single receiving container. The purpose of the discussion below is to enable one skilled in the art to combine two bulk compounding systems in accordance with the invention.

Figure 10:
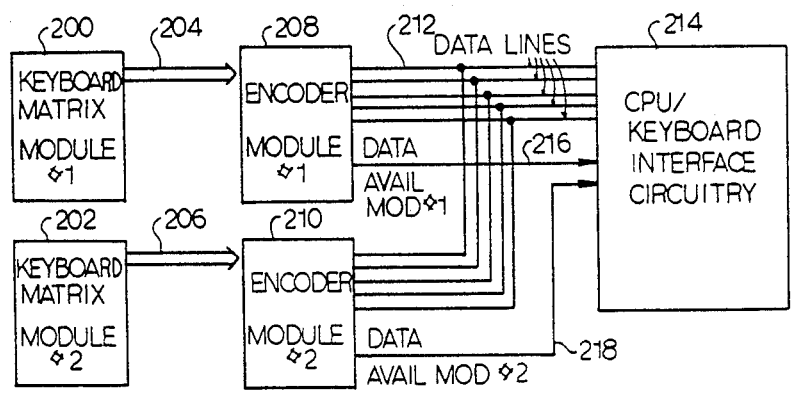
FIG. 10 is a block diagram illustrating the electrical connections for the input signals of two or more bulk compounding systems used in conjunction with each other.

Refer now to FIG. 10 which is a block diagram illustrating the electrical connections for the input signals of two or more bulk compounding systems used in conjunction with each other. As can be seen in the figure, two or more keyboards 200 and 202 for each bulk compounding system is provided. Each keyboard 200, 202 in FIG. 10 corresponds to the control panel 60 in FIG. 3. The output from each keyboard 204, 206 is fed into separate encoder modules 208 and 210. The purpose of each encoder module is to assimilate multiple signals from each keyboard into a series of binary signals. The output from each encoder module 208, 210 is then connected together along data lines 212 to be fed into a CPU interface circuitry 214. The CPU interface circuitry 214 illustrated in FIG. 10 enhances the control unit 26 illustrated in FIG. 3. The CPU interface circuitry is unable to distinguish which encoder module has sent signals to the CPU without the use of data lines 216 and 218. The presence or absence of a signal on each of these data lines indicates which keyboard has been used to enter information into the CPU. Therefore, when a user of the present invention wishes to cause two or more of the bulk compounding systems to operate in concert with each other to fill a single receiving container, the user simply inputs the amount of fluid to be transferred by each system into that particular system's keyboard matrix. The CPU is then able to receive the information from the keyboard matrix through the encoder and keep track of which pumping module is to be operated to transfer the fluids.

Figure 11:
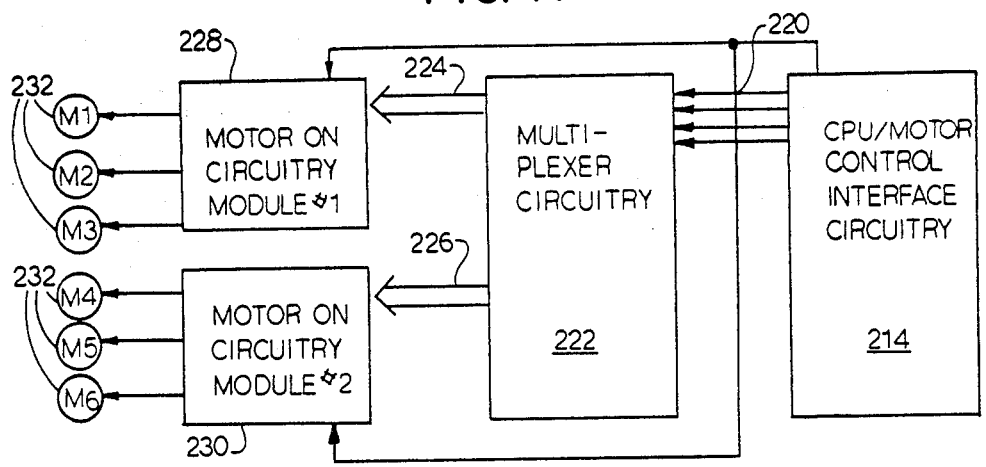
FIG. 11 is a block diagram illustrating the electrical connections for multiple sets of output signals from two or more bulk compounding systems for controlling each of the pumping modules for each bulk compounding system.

Refer now to FIG. 11 which is a block diagram illustrating the electrical connection for multiple sets of output signals from two or more bulk compounding systems for controlling each of the pumping modules for each bulk compounding system. As can be seen in FIG. 11, CPU interface circuitry 214 also functions to control the motor of each peristaltic pump in each pumping module for each bulk compounding system. The CPU 214 performs this function by assimilating the data received from each keyboard matrix as discussed above, and creating a first set of output signals 220 to be fed into multiplexer circuitry 222 which will be discussed in greater detail below. The multiplexer circuitry 222 generates a plurality of sets of output signals 224 and 226 to control two or more pumping modules 228 and 230. Each pumping module contains a series of peristaltic pumps which are driven by individual motors 232. The configuration illustrated in FIG. 11 is designed to be used with two pumping modules with three motors per module. However, it is possible to expand this configuration to handle more than two pumping modules with greater than or less than three peristaltic pumps per module.

Figure 12:
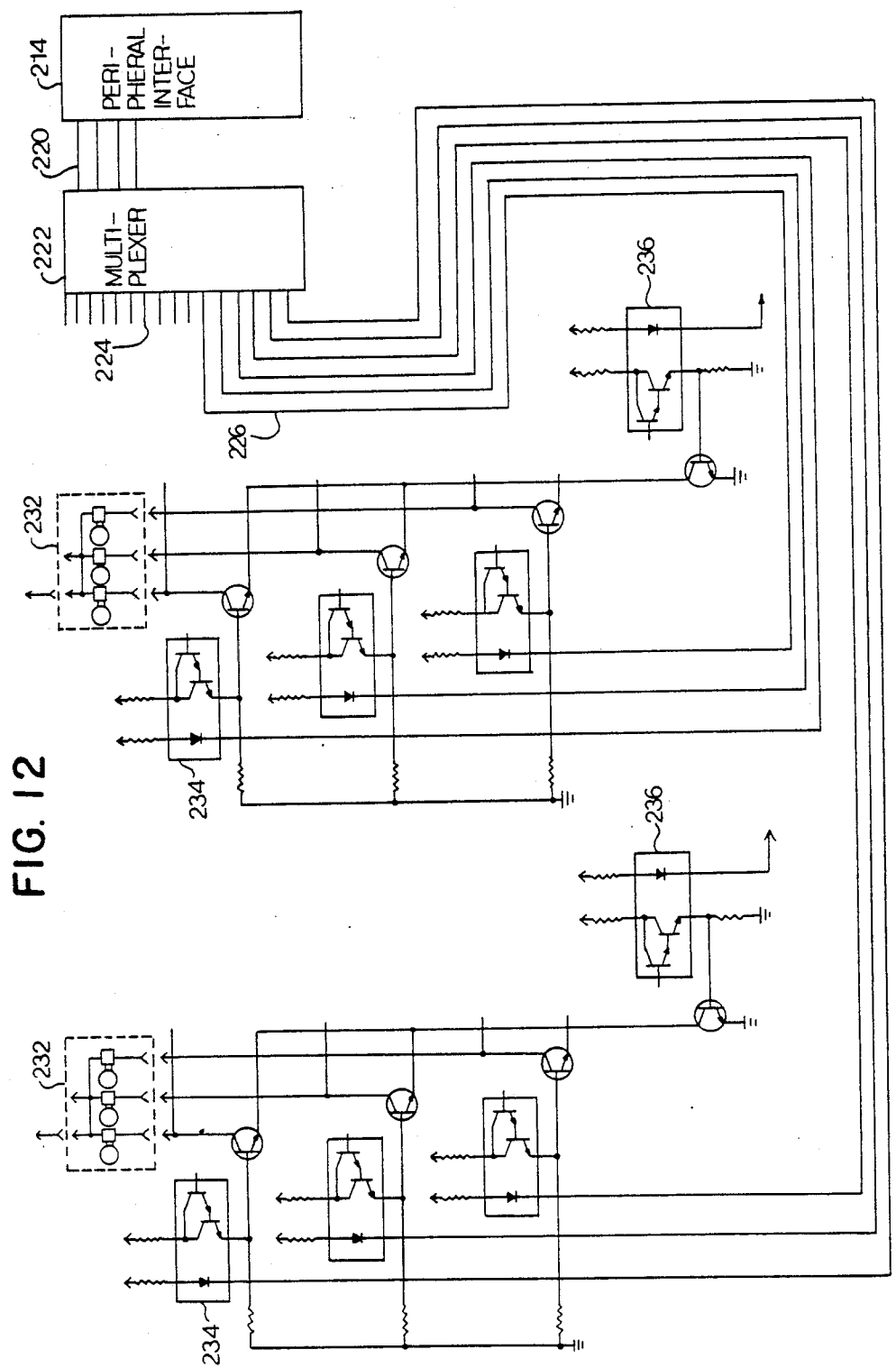
FIG. 12 is a schematic diagram of the block diagram in FIG. 11.

In order to better understand the method by which the signals are multiplexed as illustrated in FIG. 11, it is necessary to refer now to FIG. 12, which is a schematic diagram of the block diagram in FIG. 11. As described above, the peripheral interface transmits output signals 220 to the multiplexer circuitry 222. The multiplexer then converts the peripheral interface output signals to a plurality of binary level signals. The value of the sixteen output binary level signals is directly proportional to the total binary value of the four input signals from the peripheral interface output circuit. In this manner, it is possible for the four peripheral interface output lines to individually turn on any one given motor. The output signals 224-226 are then connected to each motor on/off circuit individually.

In order to turn on an individual motor 232, two conditions must occur. The first is that the opto-isolator 234 must be turned on. This is accomplished by a low level output at the multiplexer. The second condition which must occur is that a second opto-isolator 236 must also be turned on at the same time. This is also accomplished by a low level output at the multiplexer. With both opto-isolators simultaneously turned on, a current path is created allowing the motor turn on. To turn off any individual motor, one or both of the opto-isolator outputs must be changed to a high level output.

Figure 13:
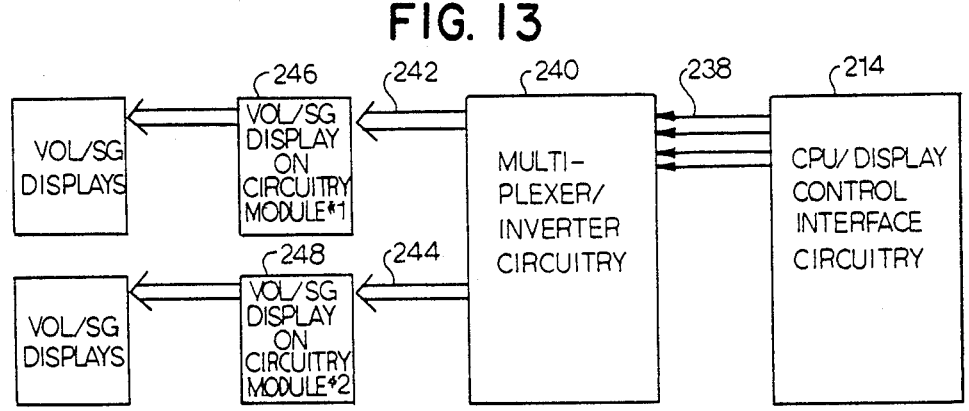
FIG. 13 is a block diagram illustrating the electrical connections for multiple sets of output signals from two or more bulk compounding systems to display the precise amount of fluids transferred by each bulk compounding system to a receiving container.
Figure 14:
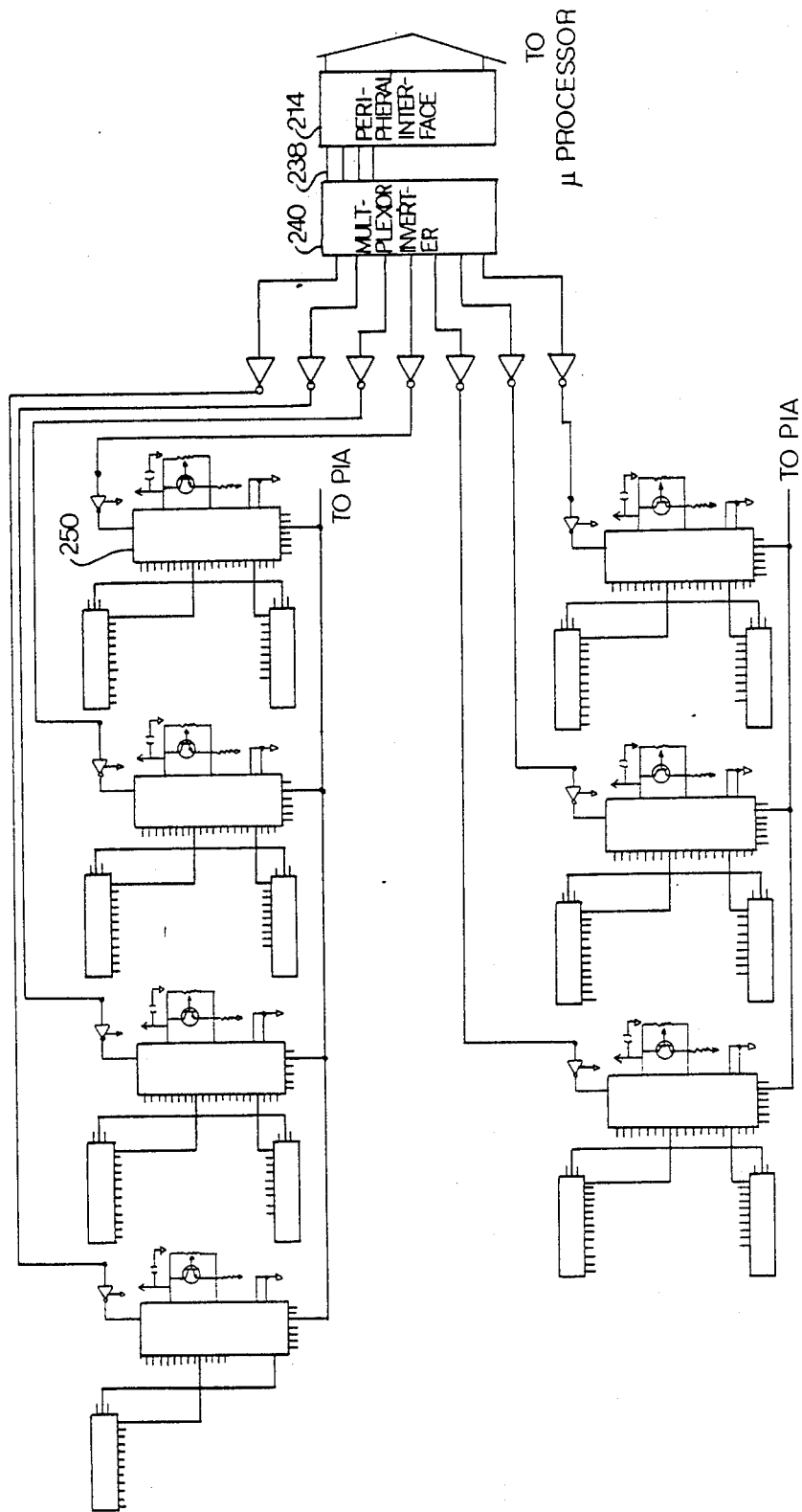
FIG. 14 is a schematic diagram of the electrical diagram in FIG. 13.

Refer now to FIG. 13 which is a block diagram illustrating the electrical connections for multiple sets of output signals from two or more bulk compounding systems to display the precise amount of fluids transferred by each bulk compounding system to a receiving container. The techniques for multiplexing display signals from the CPU 214 as illustrated in FIG. 13 is very similar to the techniques used above and discussed with respect to FIG. 11. As can be seen in FIG. 13, output signals 238 used to display the amount of fluid actually being transferred are sent from CPU 214 to multiplex-/inverter circuitry 240. The purpose of the multiplex-/inverter circuitry 240 is to assimilate the signals received from the CPU 214 and generate a plurality of output signals 242, 244 to activate display circuitry modules 246 and 248 for each bulk compounding system. A more detailed explanation of the manner in which the signals are assimilated by multiplexer/inverter circuitry 240 is discussed in greater detail with respect to FIG. 14 which is a schematic diagram of the block diagram of FIG. 13. As can be seen in FIG. 14, output signals 238 from the peripheral interface 214 are fed into multiplexer 240. As can be seen in FIG. 14, in the preferred embodiment, only four input lines are used to relay information from the peripheral interface into multiplexer 240. The multiplexer 240 generates sixteen output signals based on this information. Each output signal is ultimately used to generate a display on/off signal to indicate the amount of fluid that has been actually transferred on a display panel. The multiplexer 240 in FIG. 14 operates in a very similar manner to the multiplexer 222 in FIG. 12 as discussed above. That is, the multiplexer 240 takes the total binary value of the signals received on input lines 238 and generates sixteen output signals which are directly proportional to the values received on the input lines. For simplicity, the details of the output signals for seven output lines of the multiplexer are described in detail. As can be seen in FIG. 14, in order to turn on an individual set of volume and specific gravity displays, a low output value from the multiplexer is transmitted to an inverter 240 which in turn is transmitted to the display driver circuitry 250. At the display driver circuitry 250, the signal is again inverted and transmitted to a display driver. A low level signal at the display driver chip select line turns on the display.

In conclusion, a key feature of the invention is that two or more bulk compounding systems can be electrically connected to each other through a connector means which takes the total binary value of a relatively small number of input signals and generates a relatively large number of output signals which are directly proportional to the received value. In this manner, it is possible to cause numerous pumping modules as well as display modules on two or more bulk compounding systems to act in concert with each other with minimal modifications to the internal electronics of each unit.

Another key feature of the ivention is that the pumping modules for two or more bulk compounding systems can be arranged and connected to one another using a novel manifold in a laminar flow hood in such a manner to enhance laminar flow around the sides of each module and across the outlet port of the manifold when laminar air is flowing from the back to the front of each module.

Although the invention has been described and illustrated in detail, it is to be clearly understood that the same is by way of illustration and example only, and is not to be taken by way of limitation; the spirit and scope of this invention being limited only by the terms of the appended claims.

That which is claimed:

1. A device for connecting multiple bulk compounding systems together in which each bulk compounding system precisely controls fluid transfer of at multiple solutions to a single receiving container, each solution being contained in a separate source container, each bulk compounding system including:
   a manifold having an outlet fluid line in fluid communication with said receiving container;
   a plurality of fluid lines, each source container being in fluid communication with one of said fluid lines each of said fluid lines being in fluid communication with said manifold;
   pumping means for pumping solution in said plurality of fluid lines from each of said source containers to said receiving container;
   control means, including first means for sensing the weight of fluid in said receiving container, and second means including a peripheral interface means, said peripheral interface means having a first set of input signals for selecting an amount of fluid to be transferred from each source container to said receiving container, said peripheral interface means also having a first set of output signals for displaying the amount of solution to be transferred, and a second set of output signals for controlling said pump means to deliver a predetermined amount of solution from said source to said receiving container in response to the amount of fluid sensed in said container, wherein the improvement comprises:
   first electronic connector means for electronically connecting together said second set of output signals from more than one bulk compounding system to cause said plurality of bulk compounding systems to transfer said selected amount of fluids from said source containers to said single receiving container, said connector means having a multiplexer means for receiving said second set of output signals from each of said bulk compounding systems, and for generating a plurality of output signals to activate said pumping means for each of said bulk compounding systems.

2. A device as recited in claim 1, wherein:
   said pumping means includes a plurality of peristaltic pumps, each of said plurality of fluid lines having a peristaltic pump associated therewith for controlling the flow of fluid through said line;
   said second set of output signals for each of said bulk compounders includes a plurality of binary signals, and said multiplexer means includes a means for converting each of said plurality of binary signals into multiple binary signals in which the number of multiple binary signals corresponds to two raised to the number of said plurality of binary signals, each of said multiple binary output signals corresponding to one of said each of said plurality of binary signals being directly proportional to the value of the total binary value of said multiple binary signals for controlling each of said pumping means.

3. A device as recited in claim 2, wherein said second set of output signals for each of said bulk compounders includes four binary output signals, said multiplexer means includes a means for converting said four binary output signals into 16 binary output signals, each of said 16 binary output signals corresponding to one of said pumps.

4. A device as recited in claim 1, further including a second connector means for connecting said first set of input signals from each of said bulk compounding system to allow a user to input signals into more than one bulk compounding system to fill a receiving container, said second connector means including a means for designating a specific bulk compounding system for each of said first set of input signals.

5. A device as recited in claim 1, further including a third connector means for connecting said first set of output signals together to generate a series of display signals for more than one bulk compounding system, said third connector means having a second multiplexer means for receiving said first set of output signals from each of said bulk compounding systems, and for displaying the amount of solution to be transferred for each specific bulk compounding system.

6. A device as recited in claim 5, wherein said said first set of output signals for each of said bulk compounders includes a plurality of binary signals, and said second multiplexer means includes a means for converting each of said plurality of binary signals into multiple binary signals in which the number of multiple binary signals corresponds to two raised to the number of said plurality of binary signals, each of said plurality of binary signals being directly proportional to the value of the binary value of said multiple binary signals, each of said multiple binary output signals corresponding to a display signal representing the amount of solution to be transferred from a specific bulk compounding system.

7. A device as recited in claim 6, wherein said first set of output signals for each of said bulk compounders includes four binary output signals, said multiplexer means includes a means for converting said four binary output signals into 16 binary output signals, each of said 16 binary output signals corresponding to a display signal representing the amount of solution to be transferred from a specific bulk compounding system.

8. A device for connecting multiple bulk compounding systems together in which each bulk compounding system precisely controls fluid transfer of at least one solution to a receiving container, each bulk compounding system including:
   a plurality of solution source containers adapted to contain a fluid solution;
   a manifold having an outlet line in fluid communication with said receiving container;
   a plurality of fluid lines, each source container having one of said fluid lines in fluid communication with said manifold;
   pumping means for pumping solution in said plurality of fluid lines from each of said plurality of solution source containers to said receiving containers;
   control means, including first means for sensing the weight of fluid in said container, and second means including a peripheral interface means, said peripheral interface means having a first set of input signals for selecting an amount of fluid to be transferred from each source container to said receiving container, said peripheral interface means also having a first set of output signals for displaying the amount of solution to be transferred, and a second set of output signals for controlling said pump means to deliver a predetermined amount of solution from said source to said receiving container in response to the amount of fluids sensed in said container, wherein the improvement comprises:

a second electrical connector means for electrically connecting said first set of input signals to allow a user to input signals into more than one bulk compounding system to fill a single receiving container, said second connector means including a means for designating a specific bulk compounding system for each of said first set of input signals.

9. A device for connecting multiple bulk compounding systems together in which each bulk compounding system precisely controls fluid transfer of at least one solution to a receiving container, each bulk compounding system including:

a plurality of solution source containers adapted to contain a fluid solution;

a manifold having an outlet line in fluid communication with said receiving container;

a plurality of fluid lines, each source container having one of said fluid lines in fluid communication with said manifold;

pumping means for pumping solution in said plurality of fluid lines from each of said plurality of solution source containers to said receiving containers;

control means, including first means for sensing the weight of fluid in said container, and second means including a peripheral interface means, said peripheral interface means having a first set of input signals for selecting an amount of fluid to be transferred from each source container to said receiving container, said peripheral interface means also having a first step of output signals for displaying the amount of solution to be transferred, and a second set of output signals for controlling said pump means to deliver a predetermined amount of solution from said source to said receiving container in response to the amount of fluids sensed in said container, wherein the improvement comprises:

third connector means for connecting said first set of output signals together to generate a series of display signals for more than one bulk compounding system, said third connector means having a second multiplexer means for receiving said first set of output signals from each of said bulk compounding systems and for displaying the amount of solution to be transferred for each bulk compounding system.

* * * * *